United States Patent

Lerner et al.

[15] 3,704,786

[45] Dec. 5, 1972

[54] PARTICULATE FILTER MEDIA HAVING A GRADIENT OF REMOVAL RATINGS

[72] Inventors: Marc Lerner, Swan Lake, N.Y. 12783; Giora Erlich, 8 Soland Road, Monsey, N.Y.

[22] Filed: Aug. 30, 1971

[21] Appl. No.: 176,182

[52] U.S. Cl. ................................210/290, 210/504
[51] Int. Cl. ..............................................B01d 23/10
[58] Field of Search.........117/100 B, 100 D, 100 M, 117/100 S; 210/274, 275, 279, 289, 290

[56] References Cited

UNITED STATES PATENTS

| | | | |
|---|---|---|---|
| 293,745 | 2/1884 | Hyatt | 210/290 |
| 3,212,641 | 10/1965 | Komarmy et al. | 210/504 |
| 3,382,983 | 5/1968 | Stewart | 210/290 |
| 3,483,012 | 12/1969 | Young | 117/100 B |

*Primary Examiner*—Samih N. Zaharna
*Attorney*—Lawrence S. Lawrence

[57] ABSTRACT

A particulate filter bed in which the particles define a generally uniform gradient of removal ratings of decreasing coarseness from top to bottom, and a method of producing the filter particles therefor are provided. The bed comprises a multiplicity of particles of uniformly decreasing size and increasing specific gravity from top to bottom. The particles have cores of approximately equal size and specific gravity and outer coatings of varying thicknesses, but equal specific gravity. The specific gravity of the outer coating is substantially less than the specific gravity of the core, so that the overall specific gravity of the larger particles is less than that of the smaller particles. The method comprises encapsulating the higher specific gravity core material with lesser specific gravity material by spray coating or the like.

7 Claims, 3 Drawing Figures

PATENTED DEC 5 1972 3,704,786
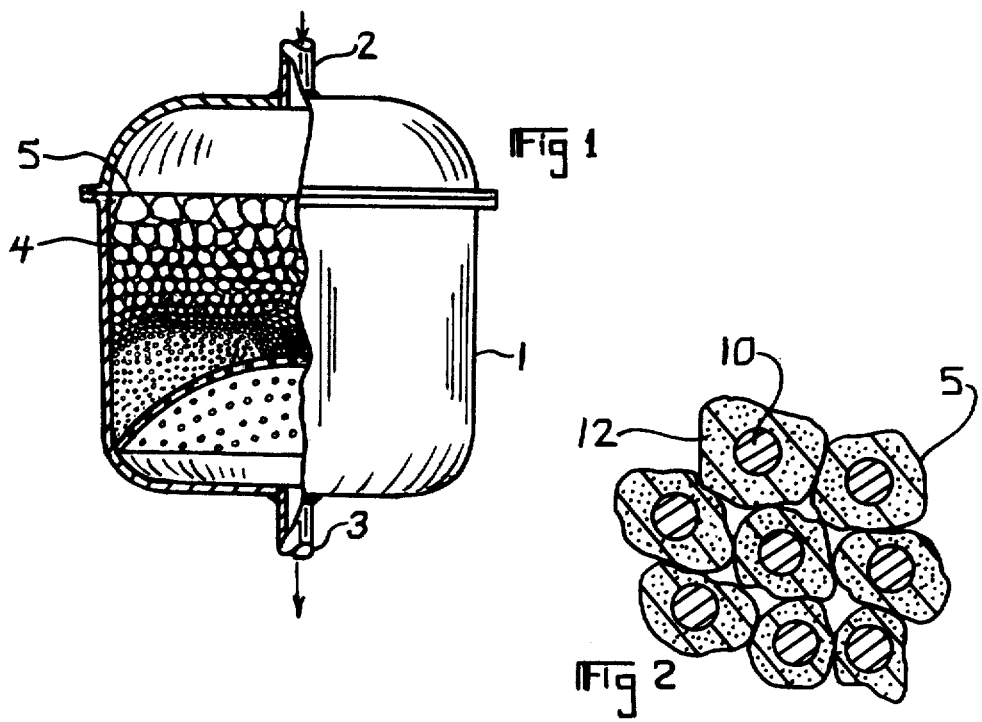
Fig 1
Fig 2
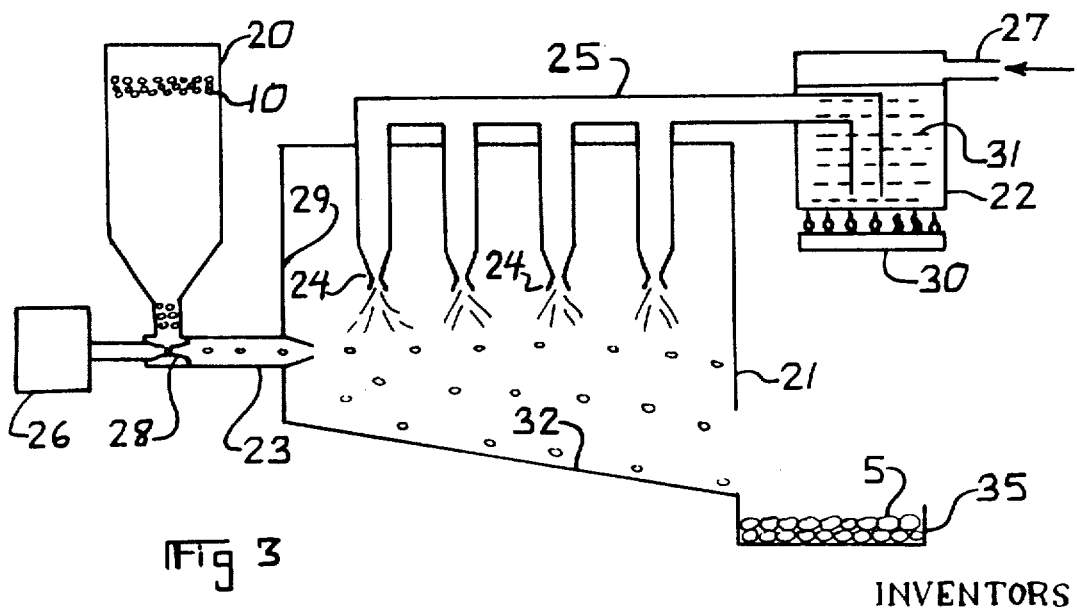
Fig 3
INVENTORS
MARC LERNER
GIORA ERLICH
BY
Lawrence S. Lawrence
ATTORNEY

PARTICULATE FILTER MEDIA HAVING A GRADIENT OF REMOVAL RATINGS

In filter units comprising beds of particulate filter medium, the filter particles are usually spherical or of irregular shape, so that the bed has a multiplicity of tortuous flow passages extending between the particles. The size of the particles and their bulk density determine the size of the passages and thus the filtration rating of the bed, the smaller the particles the finer the filter. Due to the generally random distribution of the particles within a bed and their uniform size distribution over a generally controlled range, the size of the flow passages in the bed varies between somewhat predetermined limits. It is this variance in the flow passage size which permits the bed to function as a relatively efficient filter.

A contaminant particle in the influent stream enters a flow passage in the bed and travels downwardly therein until its movement is obstructed by a contriction in the flow passage. If the contaminant particle is smaller than the smallest constriction in the flow passage it enters, it will obviously pass through the filter bed. But bed type filters are usually employed in recirculating fluid systems, so that a contaminant particle not trapped by the filter on one pass may become trapped on a subsequent pass. This is true because the particle may enter a passage having a smaller contriction on a subsequent pass and more importantly because the filter rating becomes progressively finer as contaminant particles are trapped within the bed. The entrained contaminant particles serve as additional particulate filter media of reduced size and thus reduce the filtration rating of the bed.

While this phenomonum is useful in providing and maintaining high degree of filtration, it also creates several drawbacks. The entrained contaminant particles retained near the top of the bed rapidly increase the differential pressure across the filter and thereby reduce the flow capacity of the entire system. To remedy this condition the height of filter beds has been increased and frequent backwashing to discharge the entrained particles has been required. However, this remedy is only effective where there is a random distribution of contaminant particle sizes within the range of filter passage sizes so that the majority of the particles that enter the bed are trapped at some point along its height. If the contaminant particles in the system are large with respect to the size of the flow passages in the bed, the life of the filter will be relatively short regardless of the height of the bed, since the upper portion of the bed will retain most of the contaminants. The major portion of the bed is still clean when the differential pressure becomes high enough to require backwashing. Thus, the full capacity of the filter is not utilized. This is particularly true when the contaminants are relatively large flat objects such as leaves normally encountered in swimming pool water circulation systems. The leaves or similar debris are retained on the top of the bed and affectively block normal flow through the bed.

Stratified or multilayered particulate filtration media have been proposed as a means for overcoming these dificiencies. Such media provide a coarse prefiltration layer to remove large contaminant particles without premature plugging and one or more fine downstream filtration layers to remove smaller contaminant particles which are not retained by the prefilter. In this manner it was thought possible that the full capacity of the filter medium could be substantially utilized before backwashing was required.

In U.S. Pat. No. 293,745 to Hyatt a stratified filter bed is disclosed comprising multiple horizontally disposed layers of particulate filter material of different size and specific gravity in which the particles in each layer are larger and of lesser specific gravity than the particles in the layer below. Since there is little tendency for large particles of lesser specific gravity to sink through the bed, the filter layers are maintained.

Although the advantages of providing a filter medium having layers of different filtration ratings were recognized almost a century ago by Hyatt, this principle of filtration has never been put into widespread practice. The reason for this seems to have been the difficulty and cost involved in obtaining the required particles of the proper size and specific gravity. This is particularly true where more than two layers of varying size are desired. Hyatt discloses several different types of material which can be employed in his filter, but the specific gravities of the materials disclosed are not sufficiently different to avoid mixing with the particles of the adjacent layers. This is not a problem if when the filter is initially set up care is used in placing the various layers in a filter tank. However, when the bed eventually becomes contaminated and requires backwashing, the reverse flow causes extensive mixing of the particles in the several layers. Since the specific gravity of particles involved are fairly close to one another the return to the normal filtration mode does not necessarily force the particles back to their assigned layers. The bed can thereby become a uniform mixture of particles with a broad range of sizes. This seriously decreases the removal efficiency of the filter, since the bed in such condition possesses both coarse and fine flow passages in parallel juxtaposition.

In accordance with the present invention a particulate filter bed having particles defining a uniform gradient of decreasing removal ratings ranging from coarser on top to finer on the bottom is disclosed, which overcomes the deficiencies found in the above described stratified filtration medium, and which greatly improves filtration effeciency by maximizing the number of different size passages through which the influent fluid must pass. This permits efficient utilization of the filter medium in fluid systems having a greater range of contaminant particle sizes than could be accomodated by prior filter beds.

In addition, the present invention provides a filter bed in which the relationship between filter particle sizes and specific gravities is such that no matter how the particles are placed in a filter tank or positioned therein after a backwashing cycle, when they are subjected to normal flow, the combined force of gravity and flow will arrange the particles in a generally uniform gradient of decreasing particle sizes from top to bottom.

A method of forming the filter media particles of the invention is also provided, whereby the size and specific gravity of the particles can be set to the desired values. This permits efficient use of many different types of material suitable for filtration purposes but heretofore not adaptable to multilayered beds.

The particulate filter medium bed of the invention comprises a multiplicity of particles of generally decreasing size and increasing specific gravity from top to bottom, said particles having cores of approximately equal size and specific gravity and outer coatings of varying thicknesses but approximately equal specific gravity, the specific gravity of the outer coatings being substantially less than the specific gravity of the core, so that the overall specific gravity of the larger particles is less than that of the smaller particles.

By providing particles having equally sized cores and outer coating thicknesses which are randomly distributed over a relatively large range the filter removal rating gradient has an equally large range. Generally particles having outside diameters in the range from about 0.005 to 0.125 inches or larger provide a gradient of removal ratings which is suitable for use in most recirculating fluid systems. The randomly distributed coating thicknesses prevent formation of definitive strata within the bed of particulate material because of the fact that very few particles will have exactly the same size. Since particles of different size have different specific gravity, they tend to arrange themselves in juxtapositions of decreasing size from top to bottom. The filter media of the invention is therefore more efficient and more adaptable for use in systems of varying particle contaminant size than simply stratified or multilayered filter media.

In general, the method of forming the particles of filter media comprises coating the higher specific gravity core particles by passing them through a chamber into which the lower specific gravity coating material is introduced. The coating material is adapted to adhere to the core and to itself so that the greater the distance the core material travels within the chamber of coating material, the thicker will be the coating, the larger the resultant particle and the lesser the overall specific gravity. To obtain a random distribution of coating thicknesses upon the core material, the core particles are introduced into the chamber, and the chamber designed in a manner such that the distance the core material travels within the coating chamber also randomly varies. Since the coating thickness is a function of the distance traveled by the core material within the coating chamber, it is apparent that the smallest particles in the filter media may be uncoated core particles. Accordingly, it is preferable to employ a coating chamber that will permit some particles to pass through without being coated.

After coating, the batch of randomly sized particles can be simply placed within a filter tank and subjected to flow in the normal top to bottom filter flow direction. This initial flow together with the force of gravity tends to arrange the particles according to their specific gravity, the smaller higher specific gravity particles sinking to the bottom while the larger lower specific gravity particles rise to the top of the bed.

In order to obtain the desired differential in specific gravity between the particles of varying sizes it is important that the core material have a specific gravity which is at least twice that of the coating material. This permits a gradual reduction in overall specific gravity as the outer coating increases in thickness, and results in the desired uniform stacking of larger particles upon smaller particles. If the difference in specific gravity between the core material and the outer coating material is less than the desired amount there is a tendency for particles of different sizes to co-mingle rather than to build up uniformly to form the desired filter gradient.

The core material particles in a given bed preferably have approximately equal sizes to ensure proper reduction of specific gravity in accordance with the increase in outer coating thickness. The size of the core particles fixes the minimum passage size in the bed and is selected taking this factor into consideration. Generally, particles in the range of about 0.005 to about 0.050 inches are suitable. These particles can be of uniform or irregular shape, but irregularly shaped particles are preferred since they are more readily coated with the lesser specific gravity outer material.

Any relatively hard material having a specific gravity of greater than about 2.5 can be employed as the core material. Materials such as silica sand, crushed limestone and the like are quite suitable. Metalic materials such as steel, stainless steel, lead, copper and others can also be employed.

The outer coating must be formed from a material which is readily appliable and adherable to the core material. Thermoplastic resins are particularly well suited for this purpose. Materials such as polyethylene, polypropylene, polyvinyl chloride, nylon, ABS, Teflon and the like are satisfactory. These materials can be readily applied to the core material in their molten state and upon hardening form a tough inert surface which can be used in most fluid circulating systems including those of a relatively corrosive nature, without the danger of chemical attack or deterioration.

Several different types of coating procedures are available. For example, heated core particles such as sand can be passed through a fluidized bed of aggitated powdered thermoplastic resin. The plastic will melt and adhere to each particle in varying degrees, so that a fairly random distribution of particle sizes will be achieved.

Another coating method consists of wetting the core particles before passing them through the powdered resin to facilitate adhesion between the cores and the powder. The wetting agent is preferably thermoplastic solvent, but can also be water. The powder coated particles are then heated to the thermoplastic melting point and cooled to obtain the proper hard coating.

Still another coating method is accomplished by passing cooled core particles through a molten bath of thermoplastic resin. The particles can be introduced at various depths in the molten bath.

A further coating method comprises electrostatically charging the core particles and projecting the charged particles through a fluidized bed of oppositely charged powdered thermoplastic resin. The powder will adhere to and coat the cores and can be permanently bonded in place by heating the coated particles to the thermoplastic melting point and then cooling. The thickness of the coating depends on the distance traveled by the core within the bed.

As an alternative the charged powder as well as the core particles can both be introduced in a stream into a coating chamber where they come into contact with each other. Naturally, this coating procedure is effective only if the core particles are capable of accepting an electrostatic charge. Accordingly, metallic and metallic oxide particles and other material containing a portion of metals or metal oxides are preferred.

A preferred coating method comprises passing the core particles at a relatively high velocity through a chamber into which molten thermoplastic resin is sprayed. The particles which successfully cross the entire chamber become coated with a thicker resin coating than those particles which merely fall as they enter the chamber. Accordingly, a generally random distribution of coated particle sizes can be readily obtained.

The filter media of the invention and the method for producing it is further explained with reference to the drawings in which:

FIG. 1 is a cross-sectional view of a filter assembly containing the particulate filter media.

FIG. 2 is a cross-sectional view of several coated particles and their relationship to one another.

FIG. 3 is a diagrammatic view of the preferred coating means for effectuating the method of forming the filter media particles of the invention.

The filter assembly shown in FIG. 1 comprises a tanklike housing 1 having an inlet 2 and an outlet 3, and a bed 4 of particulate filter media 5 disposed in the tank in the line of flow from the inlet to the outlet. A perforated plate 6 or other suitable means disposed in the tank beneath bed 4 prevents the particles 5 from being carried out by effluent filter flow.

The particles 5 are of randomly varying size ranging from about 0.005 to 0.125 inches in diameter and are positioned in the tank in generally decreasing order from top to bottom so that filter bed 4 comprises a uniform gradient of decreasingly sized filter flow passages ranging from coarser on top to finer on the bottom. This is accomplished by employing particles the specific gravities of which are inversely proportional to their size; the smaller particles having greater specific gravities than the larger particles. The specific gravity differential between particles of different size effectuates through the force of gravity a generally uniform stacking effect of larger particles upon smaller particles. There are, of course, in any random distribution of particle sizes groups of particles having the same size and these particles will tend to be arranged at the same vertical level. However, the number of equal size particles is preferably small, so that, the formation of definitive layers or strata particularly in the central portions of the bed 4 is kept to a minimum.

The gradient of decreasingly sized flow passages through which the flow proceeds within bed 4 greatly increases the contaminant removal efficiency over conventional filter beds having co-mingled particles of varying size or stratified layers of varied size particles. Since the uppermost particles are largest, there is little tendency for the top of the bed to become prematurely plugged with large contaminant particles. Likewise, small contaminant particles which would ordinarily pass through a filter bed are entrained in the lower portions of the bed.

The cleanability of the filter bed of the invention through backwashing is also superior to prior particulate filters. When the bed is subjected to reverse backwash flow the flow passages through which the entrained contaminant particles must pass to be discharged increase in size as the contaminant particles rise in the bed, thus easily releasing them.

As shown in FIG. 2 the particles 5 of the filter bed 4 comprise an inner core 10 of silica sand and an outer coating 12 of thermoplastic resin encapsulating the core. All of the cores 10 are of approximately equal size, while the outer coatings are of varying thicknesses. In this manner, since the specific gravity of the thermoplastic coating is approximately one-half that of the sand, the overall specific gravity of each particle 5 is inversely proportional to its size, the larger particles having a lesser specific gravity than the smaller particles.

As an alternative to encapsulating every filter particle in bed 4, the smallest particles can comprise merely uncoated cores 10. Since these particles will necessarily have the highest specific gravity in the bed, they will sink to the lower most portion thereof. Similarly, the largest particles in the bed can be plastic or other material of approximately the same specific gravity with no core. Although thermoplastic material is preferred for the outer coating because of its ability to be applied to the core, where no core is employed both thermoplastic and thermo-setting materials are suitable.

The particles 5 can be satisfactorily formed in accordance with the invention by utilizing the apparatus illustrated in FIG. 3. Core material 10 as described above is contained in hopper 20. The hopper is connected at its lower end to a nozzle 23 by means of a venturi 28. Nozzle 23 is disposed through the wall 29 of a chamber 21 in which particles 5 are coated. A source of high pressure air 26 connected to venturi 28 is adapted to provide sufficient air velocity to project particles 5 from the nozzle 23 into chamber 21.

Thermoplastic coating material 31 in its liquid state is stored in sealed reservoir 22. A plurality of spray nozzles 24 disposed at the top of chamber 21 communicate with reservoir 22 by means of manifold 25. A gas burner or the like 30 disposed beneath reservoir 22 is provided to heat the thermoplastic material 31 and thereby maintain its liquidity. High pressure air introduced by means of line 27 pressurizes the reservoir to provide sufficient motive force for the thermoplastic material to be sprayed into chamber 21 through nozzles 24.

In operation, large quantities of particles 10 are projected into chamber 21 simultaneously with the spraying therein of liquid thermoplastic material. As the particles 10 are subjected to the thermoplastic spray, they become coated therewith. The core particles are maintained at a relatively cool temperature, so that the coating material solidifies almost immediately upon contact. The thickness of the coating built up on the cores is dependent upon the length of time they are in contact with the spray. Those particles which are projected across the entire chamber will generally have thicker outer coatings than those particles which fall immediately upon entering the chamber.

Although the core particles 10 are all approximately the same size, they are preferably of irregular shape. It is this factor together with the interference of one particle with another that determines at what point within chamber 21 a particle will fall out of contact with the thermoplastic spray. The falling point of a particle within the chamber is generally random. Accordingly, the overall thicknesses of the thermoplastic coatings on the cores are randomly distributed.

As the coated particles fall they are discharged from the chamber via inclined lower surface 32 to container 25. The particulate filter media in container 25 can be placed directly into a filter housing as shown in FIG. 1. Since the larger particles have a lesser specific gravity than the smaller particles, the force of gravity and the initial filter flow tends to arrange the particles in a gradient of decreasing size from top to bottom.

Although the invention has been described primarily with regard to specific embodiments thereof, other embodiments within the scope of the invention will be apparent to those skilled in the art.

We claim:

1. In a filter assembly having a housing with an inlet and an outlet and particulate filter media intermediate said inlet and outlet, the improvement comprising said particulate filter media bed defining a generally uniform gradient of decreasing removal ratings ranging from coarser on top to finer on the bottom and including a multiplicity of particles of generally decreasing size and increasing specific gravity from top to bottom; said particles having cores of approximately equal size and specific gravity and outer coatings of varying thicknesses but approximately equal specific gravity, the specific gravity of the outer coating being substantially less than the specific gravity of the core, so that the overall specific gravity of the larger particles is less than that of the smaller particles.

2. Particulate filter media according to claim 1, in which the specific gravity of the core material is at least twice the specific gravity of the outer coating material.

3. Particulate filter media according to claim 1, in which the outer coating material is thermoplastic resin.

4. Particulate filter media according to claim 1, in which the core material is silica sand.

5. Particulate filter media according to claim 1, in which the cores are of irregular shape.

6. Particulate filter media according to claim 1, in which the cores have diameters in the range of about 0.005 inches to about 0.050 inches; and the overall particle sizes are randomly distributed over the range of about 0.005 inches to about 0.125 inches.

7. A filter assembly comprising:

a housing having an inlet at the top and an outlet at the bottom; and a bed of particulate filter media disposed in the housing in the line of flow from the inlet to the outlet; the particles of said bed defining a generally uniform gradient of decreasing removal ratings ranging from coarser on top to finer on the bottom, said bed comprising a multiplicity of particles of generally decreasing size and increasing specific gravity from top to bottom; said particles having cores of approximately equal size and specific gravity and outer coatings of varying thickness but approximately equal specific gravity, the specific gravity of the outer coating being substantially less than the specific gravity of the core, so that the overall specific gravity of the larger particles is less than that of the smaller particles.

* * * * *